United States Patent
Hoory et al.

(10) Patent No.: US 6,678,655 B2
(45) Date of Patent: Jan. 13, 2004

(54) METHOD AND SYSTEM FOR LOW BIT RATE SPEECH CODING WITH SPEECH RECOGNITION FEATURES AND PITCH PROVIDING RECONSTRUCTION OF THE SPECTRAL ENVELOPE

(75) Inventors: Ron Hoory, Haifa (IL); Dan Chazan, Haifa (IL); Ezra Silvera, Haifa (IL); Meir Zibulski, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/291,590

(22) Filed: Nov. 12, 2002

(65) Prior Publication Data

US 2003/0088402 A1 May 8, 2003

Related U.S. Application Data

(63) Continuation of application No. 09/410,085, filed on Oct. 1, 1999.

(51) Int. Cl.$^7$ .............................................. G10L 19/12
(52) U.S. Cl. ...................................... 704/223; 704/243
(58) Field of Search ........................... 704/204, 207, 704/243, 206, 221, 223

(56) References Cited

U.S. PATENT DOCUMENTS

| | | | |
|---|---|---|---|
| 4,797,926 A | * 1/1989 | Bronson et al. | 704/214 |
| 4,827,516 A | * 5/1989 | Tsukahara et al. | 704/224 |
| 4,914,701 A | 4/1990 | Zibman | |
| 4,969,193 A | * 11/1990 | Scott et al. | 704/216 |
| 5,054,085 A | * 10/1991 | Meisel et al. | 704/207 |
| 5,583,961 A | 12/1996 | Pawlewski et al. | |
| 5,754,974 A | * 5/1998 | Griffin et al. | 704/206 |
| 5,909,662 A | 6/1999 | Yamazaki et al. | |
| 5,933,801 A | 8/1999 | Fink et al. | |
| 6,092,039 A | 7/2000 | Zingher | |
| 6,336,090 B1 | 1/2002 | Chou et al. | |

* cited by examiner

Primary Examiner—Richemond Dorvil
Assistant Examiner—Donald L. Storm
(74) Attorney, Agent, or Firm—Browdy and Neimark (57) ABSTRACT

A method for encoding a digitized speech signal so as to generate data capable of being decoded as speech. A digitized speech signal is first converted to a series of feature vectors using for example known Mel-frequency Cepstral coefficients (MFCC) techniques. At successive instances instance of time a respective pitch value of the digitized speech signal is computed, and successive acoustic vectors each containing the respective pitch value and feature vector are compressed so as to derive therefrom a bit stream. A suitable decoder reverses the operation so as to extract the features vectors and pitch values, thus allowing speech reproduction and playback. In addition, speech recognition is possible using the decompressed feature vectors, with no impairment of the recognition accuracy and no computational overhead.

26 Claims, 3 Drawing Sheets

METHOD AND SYSTEM FOR LOW BIT RATE SPEECH CODING WITH SPEECH RECOGNITION FEATURES AND PITCH PROVIDING RECONSTRUCTION OF THE SPECTRAL ENVELOPE

RELATED APPLICATION

This is a continuation of copending parent application Ser. No. 09/410,085, filed Oct. 1, 1999.

This application is related to co-pending application Ser. No. 09/432,081 entitled "Method and system for speech reconstruction from speech recognition features", filed Nov. 2, 1999 to Dan Chazan et al. and assigned to the present assignee.

FIELD OF THE INVENTION

This invention relates to low bit rate speech coding and to speech recognition for the purpose of speech to text conversion.

REFERENCES

In the following description reference is made to the following publications:

[1] S. Davis and P. Mermelstein, "*Comparison of parametric representations for monosyllabic word recognition in continuously spoken sentences*", IEEE Trans ASSP, Vol. 28, No. 4, pp. 357–366, 1980.

[2] S. Young, "*A review of large-vocabulary continuous-speech recognition*", IEEE signal processing magazine, pp 45–47, September 1996.

[3] McAulay, R. J. Quatieri, T. F. "*Speech analysis-synthesis based on a sinusoidal representation*", IEEE Trans ASSP, Vol. 34, No. 4, pp. 744–754, 1986.

[4] McAulay, R. J. Quatieri, T. F. "*Sinusoidal coding*" in W. Kleijn and K. Paliwal Editors "*Speech Coding and Synthesis*", ch. 4, pp. 121–170, Elsevier 1995.

[5] Y. Medan, E. Yair and D. Chazan, "*Super resolution pitch determination of speech signals*", IEEE Trans ASSP, Vol. 39, No. 1, pp. 40–48, 1991.

[6] W. Hess, "*Pitch Determination of Speech Signals*", Springer-Verlag, 1983.

[7] G. Ramaswamy and P. Gopalakrishnan, "*Compression of acoustic features for speech recognition in network environment*", Proceedings of ICASSP 1998.

BACKGROUND OF THE INVENTION

In digital transmission of speech, usually a speech coding scheme is utilized. At the receiver the speech is decoded so that a human listener can listen to it. The decoded speech may also serve as an input to a speech recognition system. Low bit rate coding used to transmit speech through a limited bandwidth channel may impair the recognition accuracy compared to the usage of non-compressed speech. Moreover, the necessity to decode the speech introduces a computational overhead to the recognition process.

A similar problem occurs when the coded speech is stored for later playback and deferred recognition, e.g., in a hand-held device, where the storage is limited.

It is therefore desirable to encode speech at a low bit-rate so that:

1. Speech may be decoded from the encoded bit-stream (for a human listener); and
2. A recognition system may use the decoded bit-stream, with no impairment of the recognition accuracy or computational overhead.

SUMMARY OF THE INVENTION

It is therefore an object of the invention to provide a method for encoding speech at a low bit-rate to produce a bit stream which may be decoded as audible speech.

This object is realized in accordance with a first aspect of the invention by a method for encoding a digitized speech signal so as to generate data capable of being decoded as speech, said method comprising the steps of (a) converting the digitized speech signal to a series of feature vectors by:
   i) deriving at successive instances of time an estimate of the spectral envelope of the digitized speech signal,
   ii) multiplying each estimate of the spectral envelope by a predetermined set of frequency domain window functions, wherein each window occupies a narrow range of frequencies, and computing the integrals thereof, and
   iii) assigning said integrals or a set of predetermined functions thereof to respective components of a corresponding feature vector in said series of feature vectors;

(b) computing for each instance of time a respective pitch value of the digitized speech signal, and (c) compressing successive acoustic vectors each containing the respective pitch value and feature vector so as to derive therefrom a bit stream.

According to a second, complementary aspect of the invention there is provided a method for decoding a bitstream representing a compressed series of acoustic vectors each containing a respective feature vector and a respective pitch value derived at a respective instance of time, each of the feature vectors having multiple components obtained by:

i) deriving at successive instances of time an estimate of the spectral envelope of a digitized speech signal,
   ii) multiplying each estimate of the spectral envelope by a predetermined set of frequency domain window functions, wherein each window occupies a narrow range of frequencies, and computing the integral thereof, and
   iii) assigning said integrals or a set of predetermined functions thereof to a respective one of said remaining components of the feature vector;

said method comprising the steps of:

(a) separating the received bit-stream into compressed feature vectors data and compressed pitch values data,
(b) decompressing the compressed feature vectors data and outputting quantized feature vectors,
(c) decompressing the compressed pitch values data and outputting quantized pitch values, and
(d) generating a continuous speech signal, using the quantized feature vectors and pitch values.

The invention will best be appreciated with regard to speech recognition schemes as currently implemented. All speech recognition schemes start by converting the digitized speech to a set of features that are then used in all subsequent stages of the recognition process. A commonly used set of feature vectors are the Mel-frequency Cepstral coefficients (MFCC) [1, 2], which can be regarded as a specific case of the above-described feature vectors. Transmitting a compressed version of the set of feature vectors removes the overhead required for decoding the speech. The feature extraction stage of the recognition process is replaced by feature decompression, which requires fewer computations by an order of magnitude. Furthermore, low bit rate transmission of the Mel-Cepstral features (4–4.5 Kbps) is possible without impairing the recognition accuracy [7].

The invention is based on the finding that if compressed pitch information is transmitted together with the speech recognition features, it is possible to obtain a good quality reproduction of the original speech.

The encoder consists of a feature extraction module, a pitch detection module and a features and pitch compression module. The decoder consists of a decompression module for the features and pitch and a speech reconstruction module.

It should be noted that in some recognition systems, especially for tonal languages, the pitch information is used for recognition and pitch detection is applied as a part of the recognition process. In that case, the encoder only compresses the information obtained anyway during the recognition process.

It is possible to encode additional components that are not used for speech recognition, but may be used by the decoder to enhance the reconstructed speech quality.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
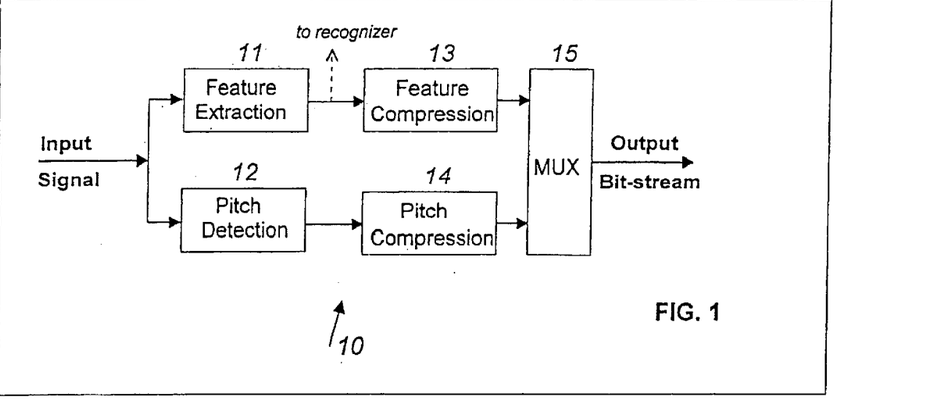
FIG. 1 is a block diagram showing functionally an encoder according to the invention.
Figure 3:
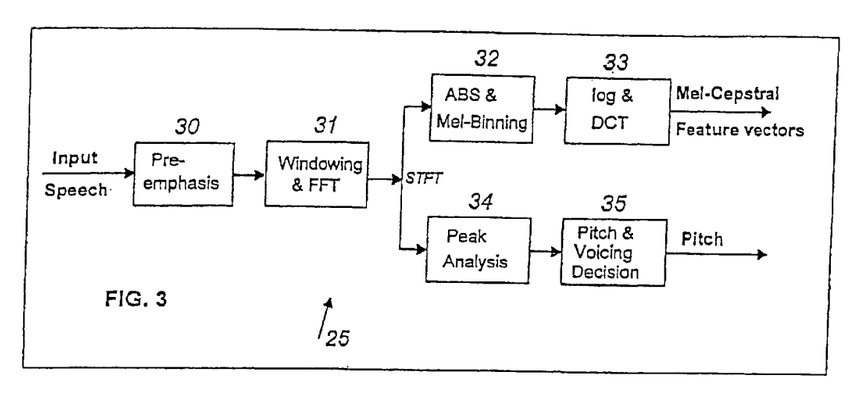
FIG. 3 is a block diagram showing functionally a feature extraction and pitch detection unit used in the encoder shown in FIG. 1.

FIG. 1 illustrates the basic structure of an encoder 10 for encoding a speech signal so as to generate data capable of being decoded as speech. An input speech signal is fed to a feature extraction unit 11 and a pitch detection unit 12. The feature extraction unit 11 produces at its output feature vectors, which may be used for speech recognition and are based on binned spectra as explained below with reference to FIGS. 5 to 8. In the preferred embodiment, Mel-Cepstral feature vectors are used. The pitch detection unit 12 produces at its output pitch values (typically, the pitch period in samples) for voiced sections of the signal. For unvoiced sections, the output of the pitch detection unit 12 is an unvoiced flag (typically, a zero pitch value). In the preferred embodiment, the feature extraction and pitch detection are carried out every fixed frame (10 msec) of speech. FIG. 3 shows functionally details of feature extraction and pitch detection units employed by the encoder.

A feature compression unit 13 is coupled to the output of the feature extraction unit 11 for compressing the feature vector data. Likewise, a pitch compression unit 14 is coupled to the output of the pitch detection unit 12 for compressing the pitch data. In the preferred embodiment, the feature compression is carried out according to [7], where a 4 Kbps quantization scheme for the Mel-Cepstral feature vectors is presented. The pitch compression is carried out by a uniform quantizer, which spans a variable range of pitch values. The range of quantization is determined by the quantized pitch and voicing decision of previous frames. In addition, specific codes are allocated for unvoiced frames, for a pitch value which is double of the previous quantized pitch and for a pitch value which is half of the previous quantized pitch. A bit-rate of 300–500 bps may be obtained with this scheme. The streams of compressed feature vectors and compressed pitch are multiplexed together by a multiplexer 15, to form an output bitstream.

It should be emphasized that the bit stream may include auxiliary information, which is not used for recognition, but enhances the decoded speech quality. For example, in most recognition systems only part of the Mel-Cepstral components are used for recognition (13 from an available 24). However, the missing components may be encoded, and used to enhance speech quality.

Figure 2:
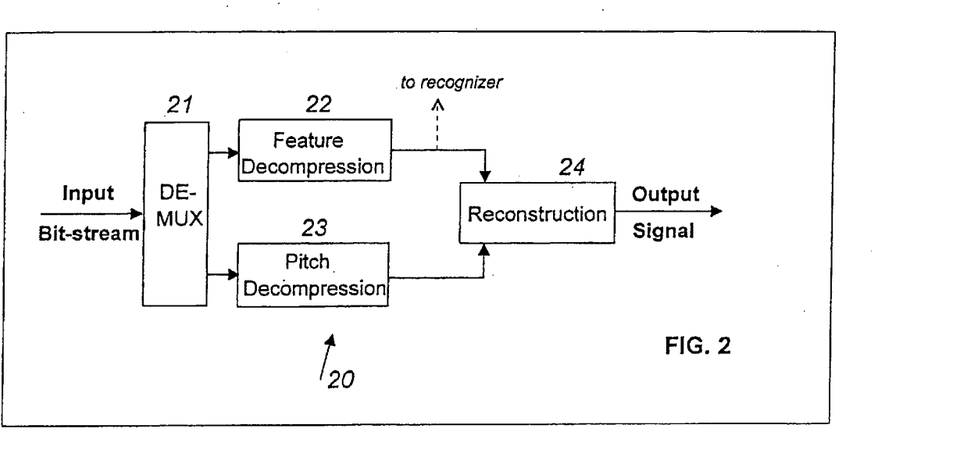
FIG. 2 is a block diagram showing functionally a decoder according to the invention.

FIG. 2 illustrates the basic structure of a decoder 20. The input bit-stream is fed to a demultiplexer 21 which separates the bit-stream into a stream of compressed feature vectors and a stream of compressed pitch. A feature decompression unit 22 and a pitch decompression unit 23 are used to decode the feature vector data and pitch data, respectively. Preferably, the feature decompression scheme is as detailed in [7]. The pitch decompression is a straightforward process, whereby the input index is converted to a pitch value within a variable range of values. The range of pitch values is updated every frame, the same way as in the compression.

The decoded feature vector may be used for speech recognition. A reconstruction module 24 uses the decoded feature vector and the decoded pitch to reconstruct a speech signal. If additional components were encoded, they can be utilized, in order to enhance the reconstruction quality. In the preferred embodiment, for every feature vector and pitch, a single speech frame (10 msec) is reconstructed. The structure of the reconstruction unit 24 is explained below with particular reference to FIG. 4 of the drawings.

FIG. 3 illustrates a computation unit 25 used by the encoder 10 for computing the Mel-Cepstral feature vectors and the pitch values. The preferred pitch detection uses a frequency domain—harmonic matching scheme. Hence, both the feature extraction unit 11 and the pitch detection unit 12 use the same Short-Time Fourier Transform (STFT). The computation unit 25 includes a pre-emphasis unit 30 for pre-emphasizing the input speech signal. The pre-emphasized speech signal is fed to a windowing and Fast Fourier Transform (FFT) unit 31 which windows the signal by a Hamming window and transforms to the frequency domain using FFT. The resulting frequency domain signal is fed to an ABS and Mel-Binning unit 32 which integrates the products of the absolute STFT coefficients and a set of triangular frequency windows, arranged on a Mel-frequency scale. The resulting vector of integrals, referred to as the binned spectrum, is fed to a log and DCT unit 33, which performs the truncated logarithm function and a DCT transform, thus computing the Mel-Cepstral feature vector. The units 30, 31, 32 and 33 are all standard procedures commonly used in recognition systems [1,2].

For pitch detection, the frequency domain signal is fed to a peak analysis unit 34, which analyzes the STFT peaks as described in [3,4]. The frequency and amplitude of every peak are computed and form the line-spectrum. A pitch and voicing decision unit 35 uses this data to decide whether the speech frame is voiced or unvoiced. If it is voiced, the pitch and voicing decision unit 35 determines the pitch period. The decisions are based on assigning each pitch candidate a confidence level, a number between 0 and 1, which quantifies the confidence that the given line spectrum was generated with this pitch. If the confidence level of all candidates is too low, the frame is considered unvoiced. Otherwise, simple rules depending on the confidence level, the pitch value and pitch values from previous frames are applied to select the best pitch candidate. Other pitch detection algorithms known in the art [5,6] may also be used provided their accuracy level is high enough.

Figure 4:
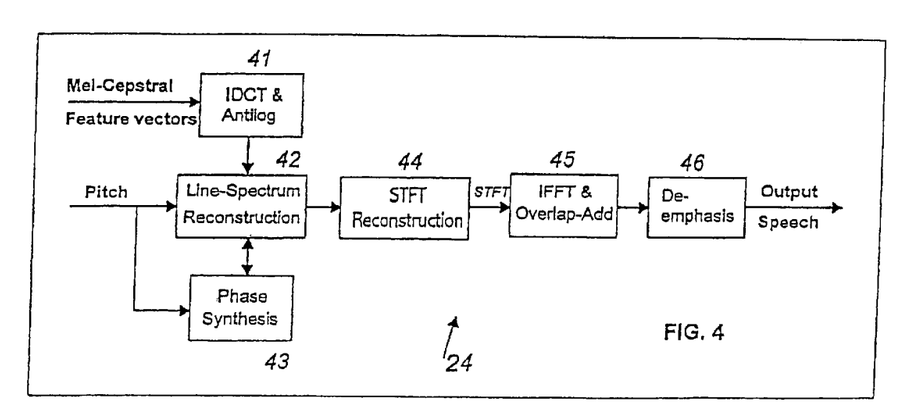
FIG. 4 is a block diagram showing functionally a reconstruction unit used in the decoder shown in FIG. 2.
Figure 5:
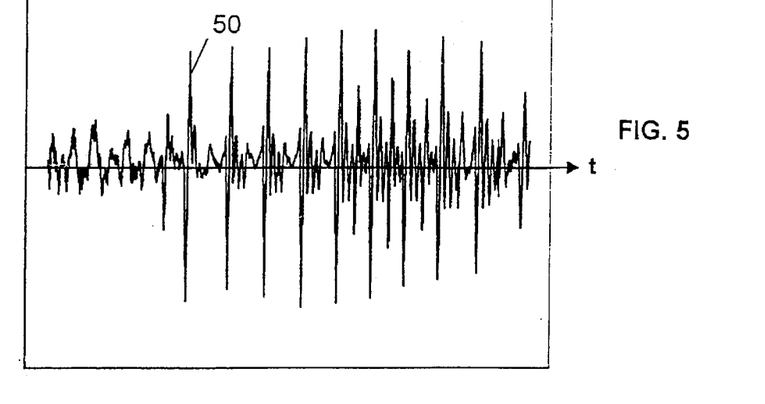
FIGS. 5 to 7 are waveforms of a speech signal during various stages of encoding according to the invention.

FIG. 4 illustrates functionally a reconstruction unit 24 used by the decoder 20. Each Mel-Cepstral feature vector is fed to an IDCT and Aniltog unit 41, which operates in inverse manner to the log and DCT unit 33 for transforming the feature vector into a binned spectrum (absolute value). The binned spectrum and pitch are then fed to a line-spectrum reconstruction unit 42, which computes the line-spectrum, i.e., the amplitudes at each pitch frequency multiple. For unvoiced frames, the pitch frequency is assumed to be the frequency difference between two adjacent discrete Fourier transform points. The computation is based on minimizing the distance between the binned spectrum derived from the reconstructed line spectrum and the input binned spectrum. The reconstructed line spectrum is represented as a weighted sum of "base functions" which are continuous functions of frequency sampled at all integer multiples of the pitch frequency. The continuous base functions are defined in terms of a single base function of the Mel-Frequency which has a relatively narrow support in frequency and is centered around the frequency origin with values for both negative and positive Mel-Frequencies. The base functions are typically shifts of this single base function by some multiples of a constant number on the Mel-Frequency scale. In order to obtain the line spectrum, the following steps are performed:

1. The line spectrum, corresponding to each base function sampled at the pitch frequency multiples, is converted to a DFT spectrum by convolving it with the Fourier transform of the Hamming window. This yields the resampled base functions.
2. The binned spectrum for each of the base functions is computed by integrating the product of the resampled base functions and each of the triangular Mel-Frequency windows. The resulting vector will probably have few non-zero entries.
3. Coefficients of the base functions are computed so that the sum of the products of the coefficients and the binned base functions is as close as possible to the input binned spectrum, subject to the condition that the coefficients are non-negative.
4. The products of the base functions sampled at the pitch frequency multiples and the computed coefficients are summed to derive the line spectrum.

The computed line spectrum and the pitch are fed to a phase synthesizer 43, which attaches a phase to each given amplitude. For voiced frames, the phase synthesis is based on a minimum phase rule [4]. For unvoiced frames, the phase is generated randomly. To this synthesized phase, the change in pitch phase from one frame to the next is added. This is the angle through which each harmonic changes over a time interval corresponding to a single frame.

An STFT reconstruction unit 44 coupled to the line-spectrum reconstruction unit 42 and to the phase synthesis unit 43 interpolates the line-spectrum into a short time Fourier transform (STFT). This is carried out by a convolution of the complex impulse train representing the line-spectrum and the synthesized phases with the Hamming window Fourier transform. The STFT is fed to an IFFT and Overlap-Add unit 45, which transforms the STFT to time domain, by first applying IFFT to obtain the windowed signal, which starts at the current frame (the window size is typically twice the frame size). Then the overlapping section (s) from the previous window(s) are added together to form the reconstructed frame. The reconstructed frame is filtered using a de-emphasis filter 46, which removes the effect of the emphasis unit 30, thus producing at its output the reconstructed signal frame.

Figure 6:
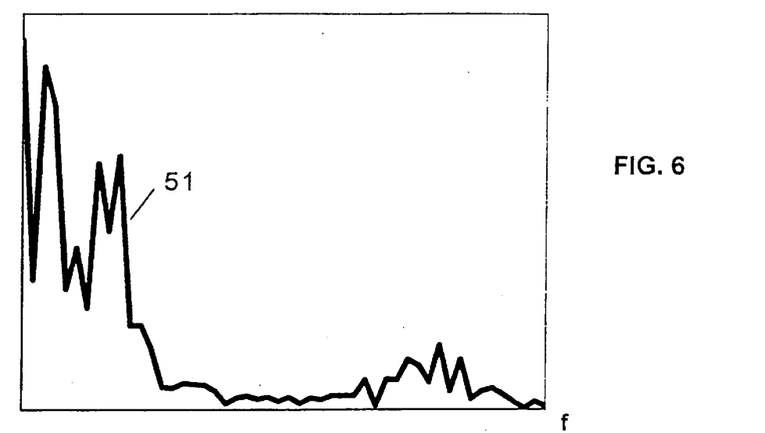
Figure 7:
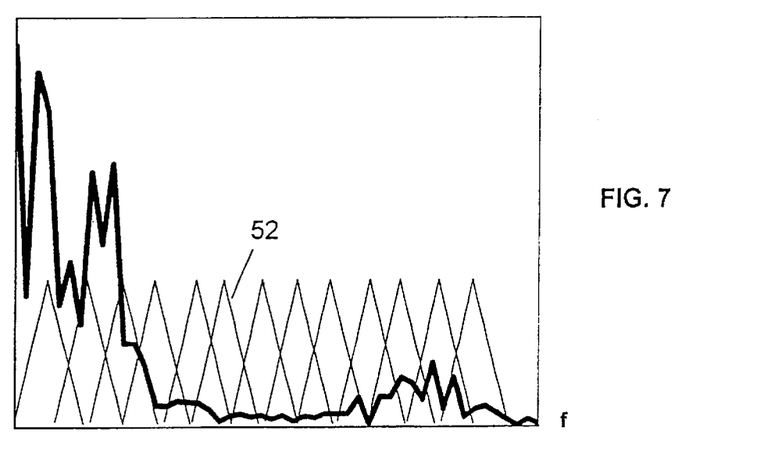

Although the preferred embodiment has been explained with regard to the use of Mel-Ceptsral feature vectors, it will be understood that other analysis techniques may be employed. FIGS. 6 and 7 show more generally the various stages in the conversion of a digitized speech signal 50 shown pictorially in FIG. 5 to a series of feature vectors, by means of the following steps.

i) deriving at successive instances of time of an estimate 51 of the spectral envelope of the digitized speech signal,
ii) multiplying each estimate of the spectral envelope by a predetermined set of frequency domain window functions 52, wherein each window is non zero over a narrow range of frequencies, and computing the integrals thereof, and
iii) assigning said integrals or a set of predetermined functions thereof to respective components of a corresponding feature vector in said series of feature vectors.

Thus, FIG. 6 shows derivation of the estimate 51 of the spectral envelope of the digitized speech signal at successive instances of time. In FIG. 7 the estimate 51 of the spectral envelope is multiplied by a predetermined set of frequency domain window functions 52. Each window function is non zero over a narrow range of frequencies.

The invention has been described with regard to an encoder and decoder that are discrete, mutually separate units. However, they can, if desired, be combined as a single unit. Likewise, the invention contemplates a dual-purpose speech recognition/playback system for voice recognition and reproduction of an encoded speech signal. Such a dual-purpose speech recognition/playback system comprises a decoder as described above with reference to FIGS. 2 and 4, and a recognition unit as is known in the art. The decoder decodes the bit stream as described above, in order to derive the speech signal, whilst the recognition unit may be used, for example, to convert the bit stream to text. Alternatively, the voice recognition unit may be mounted in association with the encoder in a dual-purpose encoder and voice recognition system. Such a system allows a speech signal to be encoded in order to generate data capable of being decoded as speech whilst allowing for continuous voice recognition using the feature vectors.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters used to designate claim steps are provided for convenience only and do not imply any particular order of performing the steps.

We claim:

1. A method for encoding a digitized speech signal so as to generate data capable of being decoded as speech, said method comprising the steps of:

(a) converting the digitized speech signal to a series of feature vectors by:
  i) deriving at successive instances of time an estimate of a spectral envelope of the digitized speech signal,
  ii) multiplying each estimate of the spectral envelope by a predetermined set of frequency domain window functions, wherein each window is non-zero over a narrow range of frequencies, and computing the integrals thereof, and
  iii) assigning said integrals or a set of predetermined functions thereof to respective components of a corresponding feature vector in said series of feature vectors;
(b) computing for each instance of time a respective pitch value of the digitized speech signal, and
(c) compressing successive acoustic vectors each containing the respective pitch value and feature vector so as to derive therefrom a bit stream.

2. A method for encoding a digitized speech signal so as to generate data capable of being decoded as speech, said method comprising the steps of:
(a) converting the digitized speech signal to a series of feature vectors by:
  i) deriving at successive instances of time an estimate of a spectral envelope of the digitized speech signal,
  ii) multiplying each estimate of the spectral envelope by a predetermined set of frequency domain window functions, wherein each window occupies a narrow range of frequencies, and computing the integrals thereof, and
  iii) assigning said integrals or a set of predetermined functions thereof to respective components of a corresponding feature vector in said series of feature vectors;
(b) computing for each instance of time a respective pitch value of the digitized speech signal,
(c) obtaining for each instance of time respective auxiliary data other than the feature vectors and pitch values,
(d) compressing the feature vectors and the respective pitch values, and
(e) compressing successive acoustic vectors each containing the respective pitch value, auxiliary data and feature vector so as to derive therefrom a bit stream.

3. An encoder for a speech coding system, said encoder being responsive to an input digitized speech signal so as to generate data capable of being decoded as speech and including:
  a feature extraction module for computing feature vectors from the input speech signal at successive instances of time, the feature extraction module including:
  a spectrum estimator for deriving an estimate of a series of spectral envelopes at successive instances of time of the digitized speech signal,
  an integrator coupled to the spectrum estimator for multiplying the spectral envelope by a predetermined set of frequency domain window functions, wherein each window occupies a narrow range of frequencies, and computing the integral thereof, and
  an assignment unit coupled to the integrator for deriving a set of predetermined functions of said integrals and assigning to respective components of a corresponding feature vector in said series of feature vectors;
  a pitch detector coupled to the feature extraction module for computing respective pitch values of the speech signal at said successive instances of time,
  a features compression module having a quantization scheme for the feature vectors for compressing the feature vectors,
  a pitch compression module having a quantization scheme for the pitch values for compressing the pitch values, and
  a multiplexer for combining the compressed feature vectors and pitch values into a bit-stream.

4. The encoder according to claim 3, further including:
  at least one auxiliary encoder for encoding auxiliary data other than the feature vectors and pitch values, and creating an enhanced bit-stream including the encoded auxiliary data.

5. The encoder according to claim 4, wherein:
  the feature vectors contain basic Mel-frequency Cepstral coefficients used for speech recognition, and
  the auxiliary data are auxiliary Mel-frequency Cepstral coefficients added to enhance the decoded speech quality.

6. The encoder according to claim 3, wherein the feature vectors contain Mel-frequency Cepstral coefficients (MFCC).

7. A method for decoding a bit-stream representing a compressed series of acoustic vectors each containing a respective feature vector and a respective pitch value derived at a respective instance of time, each of the feature vectors having multiple components obtained by:
  i) deriving at successive instances of time an estimate of the spectral envelope of a digitized speech signal,
  ii) multiplying each estimate of the spectral envelope by a predetermined set of frequency domain window functions, wherein each window occupies a narrow range of frequencies, and computing the integral thereof, and
  iii) assigning said integrals or a set of predetermined functions thereof to a respective one of said components of the feature vector;
said method comprising the steps of:
  (a) separating the received bit-stream into compressed feature vectors data and compressed pitch values data,
  (b) decompressing the compressed feature vectors data and outputting quantized feature vectors,
  (c) decompressing the compressed pitch values data and outputting quantized pitch values, and
  (d) generating a continuous speech signal, using the quantized feature vectors and pitch values.

8. The method according to claim 7, wherein the bit-stream is derived from a filtered input speech signal, and there is further included the step of:
  inverting the effect of the filtering, to produce a reconstruction of the input speech signal prior to filtering.

9. A method for decoding a received bit-stream representing a compressed series of acoustic vectors each containing a respective feature vector, a respective pitch value and respective auxiliary data all derived at a respective instance of time, each of the feature vectors having multiple components obtained by:
  i) deriving at successive instances of time an estimate of a spectral envelope of a digitized speech signal,
  ii) multiplying each estimate of the spectral envelope by a predetermined set of frequency domain window functions, wherein each window occupies a narrow range of frequencies, and computing the integral thereof, and iii) assigning said integrals or a set of predetermined functions thereof to a respective one of said components of the feature vector;

said method comprising the steps of:

(a) separating the received bit-stream into compressed feature vectors data, compressed auxiliary data and compressed pitch values data, (b) decompressing the compressed feature vectors data and outputting quantized feature vectors, (c) decompressing the compressed pitch values data and outputting quantized pitch values, (d) decompressing the compressed auxiliary data and outputting quantized auxiliary data, and (e) generating a continuous speech signal, using the quantized feature vectors, pitch values and auxiliary data.

10. A decoder for a speech coding system, said decoder being responsive to a received bit-stream representing a series of compressed acoustic vectors each containing a respective feature vector and a respective pitch value derived at a respective instance of time, each of the feature vectors having multiple components obtained by:

i) deriving at successive instances of time an estimate of a spectral envelope of a digitized speech signal, ii) multiplying each estimate of the spectral envelope by a predetermined set of frequency domain window functions, wherein each window occupies a narrow range of frequencies, and computing the integral thereof, and iii) assigning said integral or a set of predetermined functions thereof to a respective one of said components of the feature vector;

said decoder comprising:

a demultiplexer for separating the received bit-stream into compressed feature vectors data and compressed pitch values data, a features decompression module coupled to the demultiplexer for decompressing the compressed feature vectors data and outputting quantized feature vectors, a pitch decompression module coupled to the de-multiplexer for decompressing the compressed pitch values data and outputting quantized pitch values, and a reconstruction module coupled to the features decompression module and to the pitch decompression module for generating a continuous speech signal, using the quantized feature vectors and pitch values.

11. The decoder according to claim 10, wherein:

the received bit-stream is derived from a filtered input speech signal, and the reconstruction module includes a filter cancellation unit for inverting the effect of the filtering, to produce a reconstruction of the input speech signal prior to filtering.

12. A decoder for a speech coding system, said decoder being responsive to a received bit-stream representing a series of compressed acoustic vectors each containing a respective feature vector, a respective pitch value and respective auxiliary data all derived at a respective instance of time, each of the feature vectors having multiple components obtained by:

i) deriving at successive instances of time an estimate of a spectral envelope of a digitized speech signal, ii) multiplying each estimate of the spectral envelope by a predetermined set of frequency domain window functions, wherein each window occupies a narrow range of frequencies, and computing the integral thereof, and iii) assigning said integral or a set of predetermined functions thereof to a respective one of said components of the feature vector;

said decoder comprising:

a demultiplexer for separating the received bitstream into compressed feature vectors data and compressed pitch values data, a features decompression module coupled to the demultiplexer for decompressing the compressed feature vectors data and outputting quantized feature vectors, a pitch decompression module coupled to the demultiplexer for decompressing the compressed pitch values data and outputting quantized pitch values, an auxiliary data decompression module coupled to the demultiplexer for decompressing the compressed auxiliary data and outputting quantized auxiliary data, and a reconstruction module coupled to the features decompression module, to the pitch decompression module and to the auxiliary data decompression module for generating a continuous speech signal, using the quantized feature vectors, pitch values and auxiliary data.

13. The decoder according to claim 12, wherein:

the feature vectors contain basic Mel-frequency Cepstral coefficients used for speech recognition, and the auxiliary data includes auxiliary Mel-frequency Cepstral coefficients added to enhance the decoded speech quality.

14. A dual purpose speech recognition/playback system for voice recognition and reproduction of an encoded speech signal, said dual purpose speech recognition/-playback system comprising a decoder and a recognition unit:

the decoder comprising means for decoding and playing back a bit-stream representing a series of compressed acoustic vectors each containing a respective feature vector obtained by deriving at successive instances of time an estimate of a spectral envelope of the digitized speech signal, for multiplying each estimate of the spectral envelope by a predetermined set of frequency domain window functions, wherein each window is non-zero over a narrow range of frequencies, and for computing the integrals thereof, and said series of compressed acoustic vectors further containing a respective pitch value derived at a respective instance of time, said decoder including:

a demultiplexer for separating the bit-stream into compressed feature vectors and compressed pitch values, a features decompression module coupled to the demultiplexer for decompressing the feature vectors data and outputting quantized feature vectors, a pitch decompression module coupled to the demultiplexer for decompressing pitch values data embedded in the encoded speech signal and outputting quantized pitch values, and a reconstruction module coupled to the features decompression module and to the pitch decompression module for generating a continuous speech signal, using the quantized feature vectors and pitch values; and the recognition unit being responsive to the decoded feature vectors for continuous speech recognition.

15. The dual purpose speech recognition/playback system according to claim 14, wherein the recognition unit is further responsive to the decoded pitch values for continuous speech recognition.

16. The dual purpose speech recognition/playback system according to claim 14, wherein:
the decoder further includes an auxiliary data decompression module coupled to the demultiplexer for decompressing compressed auxiliary data embedded within the bit stream in addition to the feature vectors data and pitch values data for generating quantized auxiliary data, and
the reconstruction module is further coupled to the auxiliary data decompression module for generating said continuous speech signal using the quantized auxiliary data.

17. A dual purpose encoder and voice recognition system for encoding a speech signal so as to generate data capable of being decoded as speech and continuous voice recognition, the encoder comprising:
a feature extraction module for computing a series of feature vectors from the input speech signal at successive instances of time, the feature extraction module including:
a spectrum estimator for deriving an estimate of a series of spectral envelopes at successive instances of time of the digitized speech signal,
an integrator coupled to the spectrum estimator for multiplying the spectral envelope by a predetermined set of frequency domain window functions, wherein each window occupies a narrow range of frequencies, and computing the integral thereof, and
an assignment unit coupled to the integrator for deriving a set of predetermined functions of said integrals and assigning to respective components of a corresponding feature vector in said series of feature vectors;
a pitch detector coupled to the feature extraction module for computing respective pitch values of the speech signal at a given set of instances, and
a recognition unit coupled to the feature extraction module and being responsive to the feature vectors for continuous speech recognition.

18. The recognition-adapted encoder according to claim 17, wherein:
the recognition system uses the feature vectors computed by the encoder in addition to the computed pitch values for continuous speech recognition.

19. A computer program product comprising a computer useable medium having computer readable program code embodied therein for encoding a digitized speech signal so as to generate data capable of being decoded as speech, the computer readable program code comprising:
computer readable program code for causing the computer to convert the digitized speech signal to a series of feature vectors by:
i) deriving at successive instances of time an estimate of the spectral envelope of the digitized speech signal,
ii) multiplying each estimate of the spectral envelope by a predetermined set of frequency domain window functions, wherein each window is non-zero over a narrow range of frequencies, and computing the integrals thereof, and
iii) assigning said integrals or a set of predetermined functions thereof to respective components of a corresponding feature vector in said series of feature vectors;
computer readable program code for causing the computer to compute for each instance of time a respective pitch value of the digitized speech signal, and
computer readable program code for causing the computer to compress successive acoustic vectors each containing the respective pitch value and feature vector so as to derive therefrom a bit stream.

20. A computer program product comprising a computer useable medium having computer readable program code embodied therein for encoding a digitized speech signal so as to generate data capable of being decoded as speech, the computer readable program code comprising:
computer readable program code for causing the computer to convert the digitized speech signal to a series of feature vectors by:
i) deriving at successive instances of time an estimate of the spectral envelope of the digitized speech signal,
ii) multiplying each estimate of the spectral envelope by a predetermined set of frequency domain window functions, wherein each window occupies a narrow range of frequencies, and computing the integrals thereof, and
iii) assigning said integrals or a set of predetermined functions thereof to respective components of a corresponding feature vector in said series of feature vectors;
computer readable program code for causing the computer to compute for each instance of time a respective pitch value of the digitized speech signal,
computer readable program code for causing the computer to obtain for each instance of time respective auxiliary data other than the feature vectors and pitch values,
computer readable program code for causing the computer to compress the feature vectors and the respective pitch values, and
computer readable program code for causing the computer to compress successive acoustic vectors each containing the respective pitch value, auxiliary data and feature vector so as to derive therefrom a bit stream.

21. A program storage device readable by machine, tangibly embodying a program of instructions executable by the machine to perform method steps for encoding a digitized speech signal so as to generate data capable of being decoded as speech, the method steps comprising:
(a) converting the digitized speech signal to a series of feature vectors by:
i) deriving at successive instances of time an estimate of the spectral envelope of the digitized speech signal,
ii) multiplying each estimate of the spectral envelope by a predetermined set of frequency domain window functions, wherein each window is non-zero over a narrow range of frequencies, and computing the integrals thereof, and
iii) assigning said integrals or a set of predetermined functions thereof to respective components of a corresponding feature vector in said series of feature vectors;
(b) computing for each instance of time a respective pitch value of the digitized speech signal, and
(c) compressing successive acoustic vectors each containing the respective pitch value and feature vector so as to derive therefrom a bit stream.

22. A program storage device readable by machine, tangibly embodying a program of instructions executable by the machine to perform method steps for encoding a digitized speech signal so as to generate data capable of being decoded as speech, the method steps comprising:

(a) converting the digitized speech signal to a series of feature vectors by:
  i) deriving at successive instances of time an estimate of the spectral envelope of the digitized speech signal,
  ii) multiplying each estimate of the spectral envelope by a predetermined set of frequency domain window functions, wherein each window occupies a narrow range of frequencies, and computing the integrals thereof, and
  iii) assigning said integrals or a set of predetermined functions thereof to respective components of a corresponding feature vector in said series of feature vectors;
(b) computing for each instance of time a respective pitch value of the digitized speech signal,
(c) obtaining for each instance of time respective auxiliary data other than the feature vectors and pitch values,
(d) compressing the feature vectors and the respective pitch values, and
(e) compressing successive acoustic vectors each containing the respective pitch value, auxiliary data and feature vector so as to derive therefrom a bit stream.

23. A computer program product comprising a computer useable medium having computer readable program code embodied therein for decoding a bit-stream representing a compressed series of acoustic vectors each containing a respective feature vector and a respective pitch value derived at a respective instance of time, each of the feature vectors having multiple components obtained by:
  i) deriving at successive instances of time an estimate of the spectral envelope of a digitized speech signal,
  ii) multiplying each estimate of the spectral envelope by a predetermined set of frequency domain window functions, wherein each window occupies a narrow range of frequencies, and computing the integral thereof, and
  iii) assigning said integrals or a set of predetermined functions thereof to a respective one of said components of the feature vector;
said computer program product comprising:
  computer readable program code for causing the computer to separate the received bit-stream into compressed feature vectors data and compressed pitch values data,
  computer readable program code for causing the computer to decompress the compressed feature vectors data and outputting quantized feature vectors,
  computer readable program code for causing the computer to decompress the compressed pitch values data and outputting quantized pitch values, and
  computer readable program code for causing the computer to generate a continuous speech signal, using the quantized feature vectors and pitch values.

24. A computer program product comprising a computer useable medium having computer readable program code embodied therein for decoding a bit-stream representing a compressed series of acoustic vectors each containing a respective feature vector, a respective pitch value and respective auxiliary data all derived at a respective instance of time, each of the feature vectors having multiple components obtained by:
  i) deriving at successive instances of time an estimate of the spectral envelope of a digitized speech signal,
  ii) multiplying each estimate of the spectral envelope by a predetermined set of frequency domain window functions, wherein each window occupies a narrow range of frequencies, and computing the integral thereof, and
  iii) assigning said integrals or a set of predetermined functions thereof to a respective one of said components of the feature vector;
said computer program product comprising:
  computer readable program code for causing the computer to separate the received bit-stream into compressed feature vectors data, compressed auxiliary data and compressed pitch values data,
  computer readable program code for causing the computer to decompress the compressed feature vectors data and outputting quantized feature vectors,
  computer readable program code for causing the computer to decompress the compressed pitch values data and outputting quantized pitch values,
  computer readable program code for causing the computer to decompress the compressed auxiliary data and outputting quantized auxiliary data, and
  computer readable program code for causing the computer to generate a continuous speech signal, using the quantized feature vectors, pitch values and auxiliary data.

25. A program storage device readable by machine, tangibly embodying a program of instructions executable by the machine to perform method steps for decoding a bit-stream representing a compressed series of acoustic vectors each containing a respective feature vector and a respective pitch value derived at a respective instance of time, each of the feature vectors having multiple components obtained by:
  i) deriving at successive instances of time an estimate of the spectral envelope of a digitized speech signal,
  ii) multiplying each estimate of the spectral envelope by a predetermined set of frequency domain window functions, wherein each window occupies a narrow range of frequencies, and computing the integral thereof, and
  iii) assigning said integrals or a set of predetermined functions thereof to a respective one of said components of the feature vector;
said method steps comprising:
  (a) separating the received bit-stream into compressed feature vectors data and compressed pitch values data,
  (b) decompressing the compressed feature vectors data and outputting quantized feature vectors,
  (c) decompressing the compressed pitch values data and outputting quantized pitch values, and
  (d) generating a continuous speech signal, using the quantized feature vectors and pitch values.

26. A program storage device readable by machine, tangibly embodying a program of instructions executable by the machine to perform method steps for decoding a bit-stream representing a compressed series of acoustic vectors each containing a respective feature vector, a respective pitch value and respective auxiliary data all derived at a respective instance of time, each of the feature vectors having multiple components obtained by:
  i) deriving at successive instances of time an estimate of the spectral envelope of a digitized speech signal,
  ii) multiplying each estimate of the spectral envelope by a predetermined set of frequency domain window functions, wherein each window occupies a narrow range of frequencies, and computing the integral thereof, and iii) assigning said integrals or a set of predetermined functions thereof to a respective one of said components of the feature vector;

said method steps comprising:

(a) separating the received bit-stream into compressed feature vectors data, compressed auxiliary data and compressed pitch values data, (b) decompressing the compressed feature vectors data and outputting quantized feature vectors, (c) decompressing the compressed pitch values data and outputting quantized pitch values, (d) decompressing the compressed auxiliary data and outputting quantized auxiliary data, and (e) generating a continuous speech signal, using the quantized feature vectors, pitch values and auxiliary data.

* * * * *